Figure 7:
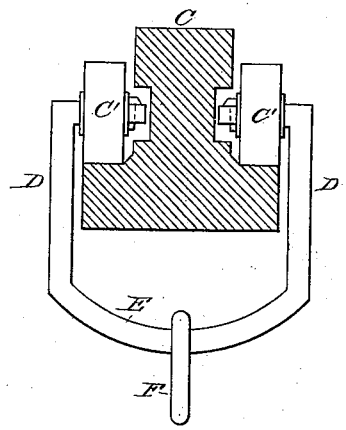

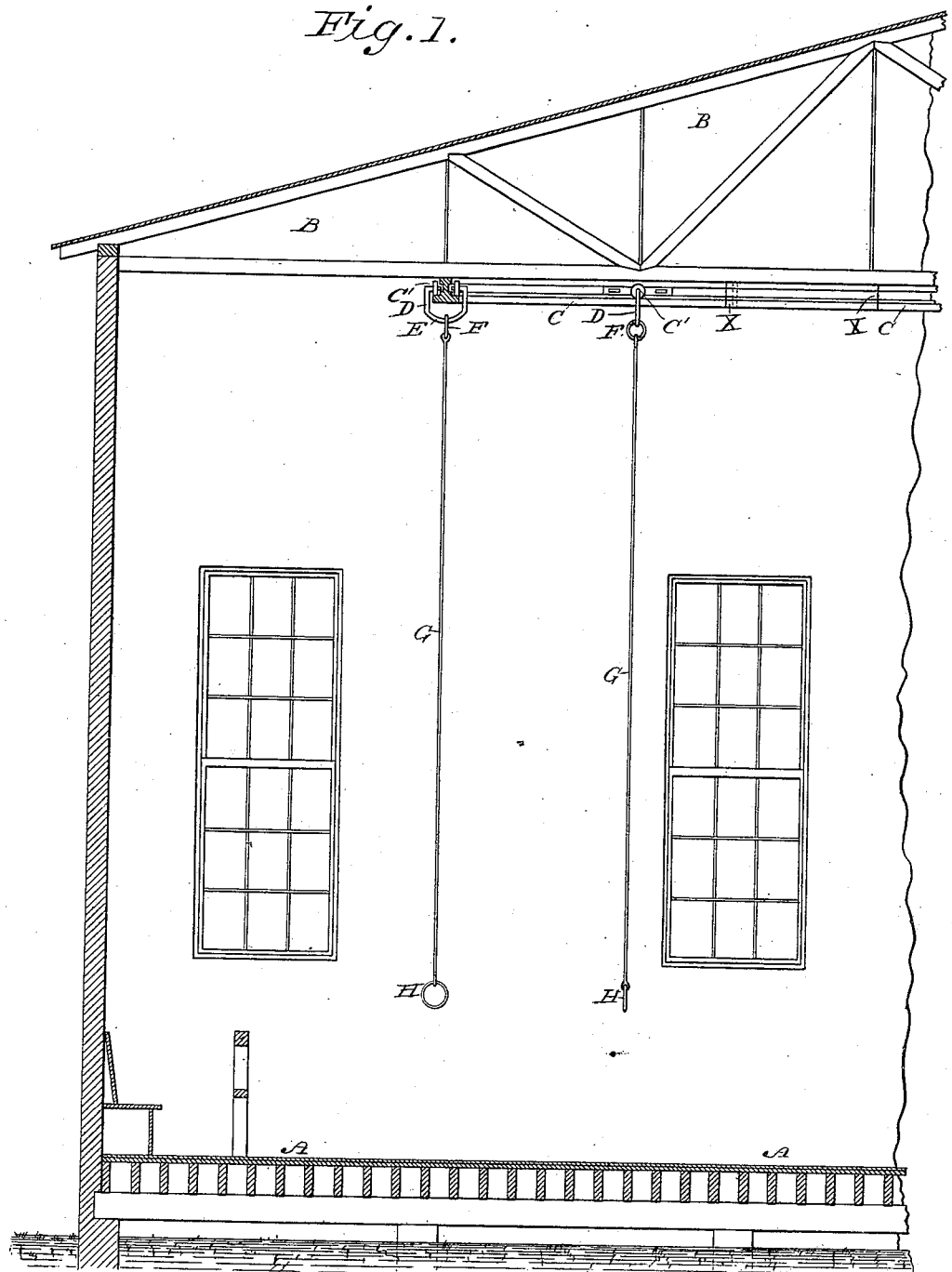

(No Model.) 4 Sheets—Sheet 2.
R. H. RICE.
SKATING APPLIANCE.
No. 332,945. Patented Dec. 22, 1885.
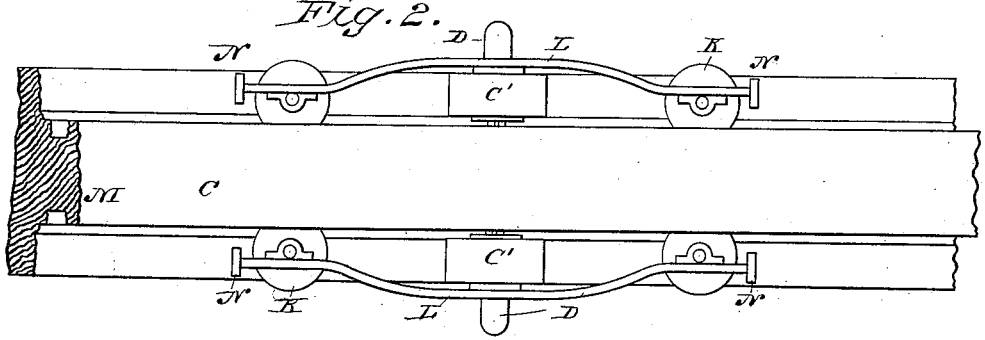
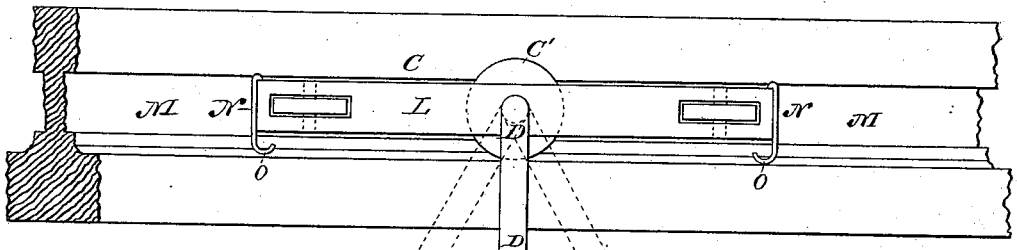
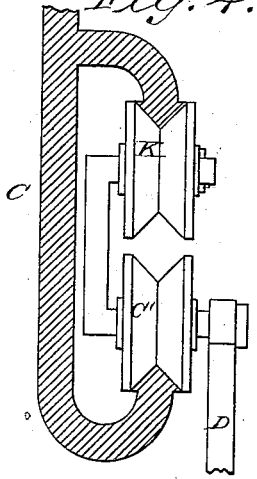
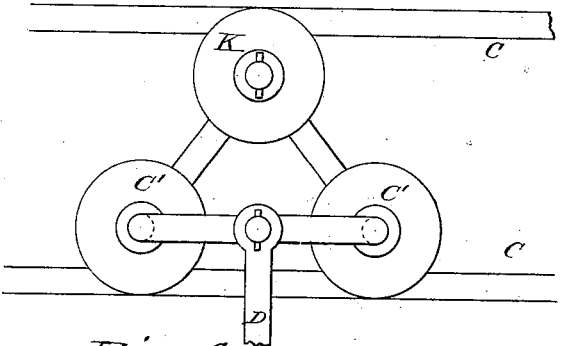
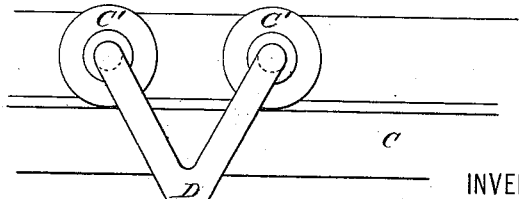
WITNESSES
Ed. A. Newman,
Al. C. Newman.
INVENTOR
Robert H. Rice,
By his Attorneys
Baldwin, Hopkins, & Peyton.

(No Model.) 4 Sheets—Sheet 3.

R. H. RICE.
SKATING APPLIANCE.

No. 332,945. Patented Dec. 22, 1885.

WITNESSES
Ed. A. Newman
Al. C. Newman

INVENTOR
Robert H. Rice,
By his Attorneys
Baldwin, Hopkins, & Peyton (No Model.)  4 Sheets—Sheet 4.

R. H. RICE.
SKATING APPLIANCE.

No. 332,945. Patented Dec. 22, 1885.

WITNESSES
Ed. A. Newman,
Al. C. Newman.

INVENTOR
Robert H. Rice,
By his Attorneys
Baldwin, Hopkins, & Peyton.

UNITED STATES PATENT OFFICE.

ROBERT H. RICE, OF FREMONT, OHIO.

SKATING APPLIANCE.

SPECIFICATION forming part of Letters Patent No. 332,945, dated December 22, 1885.

Application filed March 17, 1885. Serial No. 159,205. (No model.)

*To all whom it may concern:*

Be it known that I, ROBERT H. RICE, of Fremont, in the county of Sandusky and State of Ohio, have invented certain new and useful Improvements in Appliances to Aid Persons in Learning to Skate and in Skating, of which the following is a specification, reference being had to the accompanying drawings.

Heretofore beginners in the art of roller-skating have generally been obliged to have assistance from experts to aid them and prevent them from falling, or have had to hold on to railings, walls, or the like, and frequent and serious accidents have occurred to them for want of safer and better supports. Even experts in skating, particularly ladies or large or elderly people, generally fear the injury of falls when skating and prefer some safe support. They are also often deterred from further enjoying this delightful and beneficial recreation on account of a single injurious fall.

The object of my invention is to provide an improved means by which both beginners and adepts in the art of roller-skating may support themselves, and not only be relieved from dangers above mentioned, but also be aided in their movements upon a skating-surface. To this end I employ, as has been done before in connection with a skating surface or inclosure, a suitable overhead endless curved way upon which moves a small anti-friction slide or trundle from which depends a cord, fine wire, or the like to within reach of the skater, which he can hold onto as a support and guide.

I am aware that an overhead track or way and a trolley or weight-carrying car or carriage traveling thereon, and a pendent rope or chain or hook for lifting or sustaining weights to be moved by the car are not new; but my invention is unlike any of these things in structure and purpose, and is only adapted as a guide and support and aid to a beginner or one more advanced in the art of skating, &c., the general idea and plan being similar to those shown in English Patent No. 2,028 of 1876.

It is obvious that my appliances must be made as light and tiny as possible consistent with their object, so as to be as free from friction and as easily movable as possible, and my design is that the slide or trundle and its cord and attachments in their best form shall not exceed a few ounces in weight.

Figure 8:
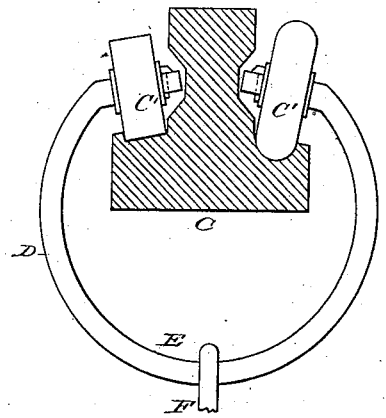
Figure 9:
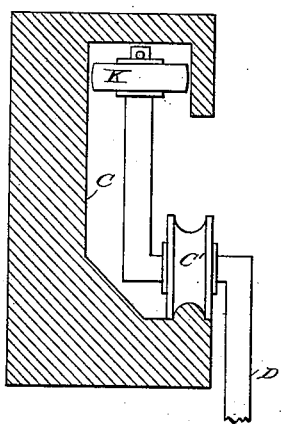
Figure 10:
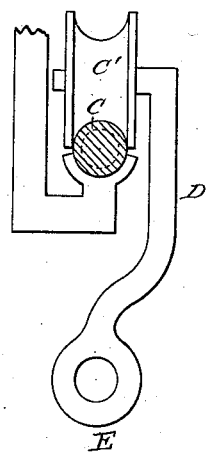
Figure 11:
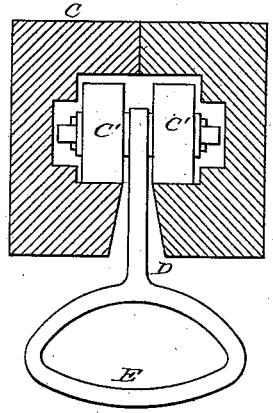
Figure 14:
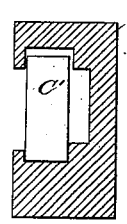
Figure 12:
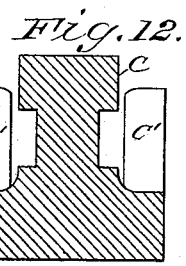
Figure 13:
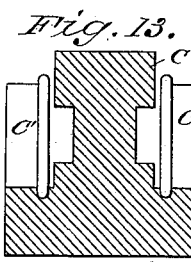
Figure 15:
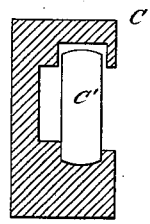
Figure 16:
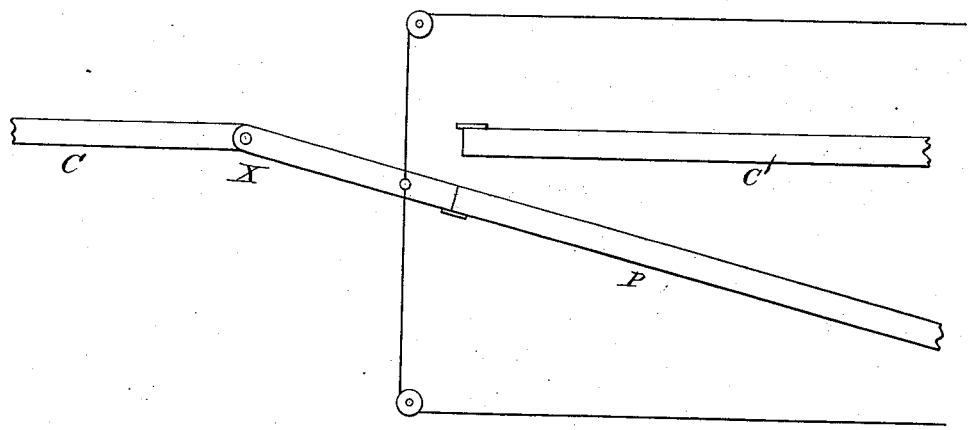
Figure 17:
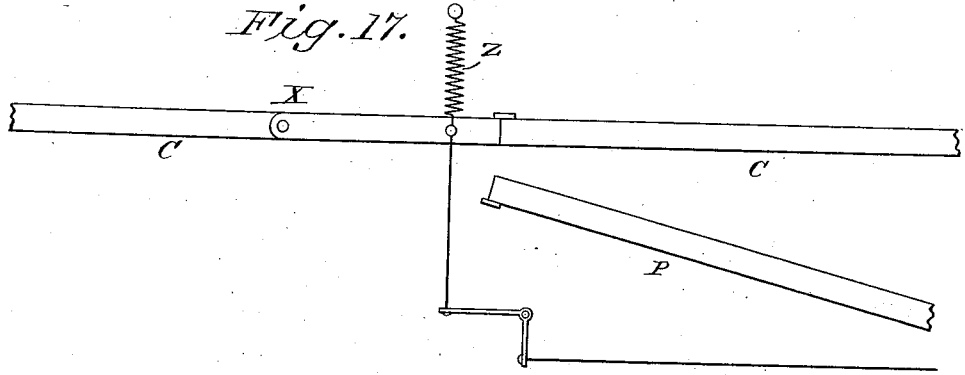
Figure 18:
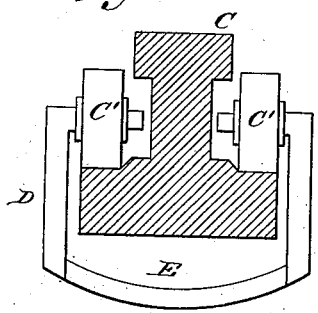

In the accompanying drawings, illustrating my invention, Figure 1 is a sectional view of a "rink" provided with my invention. Fig. 2 is a top view of one form of my apparatus, in which is shown a trundle with two riding-wheels, and with anti-friction guide-rollers bearing in a grooved bar. Fig. 3 is a side view of the devices shown in Fig. 2. Fig. 4 is an elevation, partly in section, of a track and a trundle having a single riding-wheel and a single guide-roller above it. Fig. 5 is a side view of a trundle having two riding-wheels and one guide-roller above. Fig. 6 is a side view of a trundle, showing two riding-wheels and no guide-roller. This form of trundle, however, is intended to have four wheels and run on two tracks, but a side elevation will of course exhibit only two of the wheels, the other two being supposed to be hidden, and all being connected by a bow having a curved bottom, as in the other figures of the drawings. Fig. 7 is an end view, partly in section, of a trundle having two vertical wheels running on plain tracks. Fig. 8 is a similar view showing the wheels inclined, and one of them curved, so as to fit a concave track, and the other wheel running in a grooved track. Either form of these might be employed for both sides. Fig. 9 is a view, partly in section, of a trundle provided with a single riding-wheel and a single guide-roller, the pendent arm being rigid with the axle of the riding-wheel. Fig. 10 is a view similar to Fig. 9, showing the pendent arm and showing a section of a cable or rod for a way or a tube, as indicated by the dotted lines. Fig. 11 is a view showing a section of two tracks connected above and having an opening below, so as to form an inclosure for the trundle, which is provided with two wheels, and the bow depends from the center between the wheels and tracks. Fig. 12 is a view showing a section of a double track and two trundle-wheels, the tracks and wheels being curved on one side. Fig. 13 is a similar view showing flanged wheels and grooved tracks. Fig. 14 is a view showing a track in section and a single trundle-wheel running in grooves above and below, whereby it will be kept in place. Fig. 15 is a similar view showing a grooved track and a curved-faced wheel. Fig. 16 is a diagrammatical or mere outline plan view of an overhead way and switch and side track with cords and pulleys to operate the switch from below, the cords being assumed, as is the fact in practice, to extend down to near the floor of the rink. Fig. 17 is a similar view showing wires, a bell-crank lever, and a switch-spring. Fig. 18 is an end view of a trundle like that shown in Fig. 6.

Referring to the letters upon the drawings in aid of description in detail of my improvement, A in Fig. 1 indicates an ordinary skating-surface covered by an ordinary inclosure, B.

C indicates an ordinary continuous way properly supported over the skating-surface. Upon such a way, mounted upon an axle, as shown in Fig. 10, is a small anti-friction wheel or roller, C'. In Fig. 11 are shown two anti-friction wheels, C', mounted upon their axles, and two tracks or bearing-surfaces, C, are provided for them.

Other figures of my drawings illustrate other forms of embodiment of my improvements, in which one, two, three, or four anti-friction riding-wheels, C', are shown. The way may be of wood or metal, and a rod or tube or cable may be employed, as shown in Fig. 10. A section of it may be hinged or pivoted, so as to let the little slides or trundles on or off at pleasure, as indicated at x in Fig. 1 by the vertical lines.

D indicates a pendent arm or bow connected with the axle or axles of the anti-friction wheel or wheels, with a curved bottom part, E, upon which is a loose hook or ring, F. The pendent arm or bow in each case (except in the forms shown in Figs. 4, 6, 9, and 10, in which it is fixed) is preferably pivoted, so as to be capable of oscillating movement in the direction of travel of the trundle. The arm or bow having its bottom part curved, the ring or hook F will have free movement in a direction transverse to the direction of travel of the trundle. This construction tends to prevent binding of the wheels upon the track and to keep them in place, bearing constantly upon their ways when strain is exerted on the pendent cord G, which may be provided with a handle or handles, H, as usual, if desired, for the accommodation of the skater.

In Figs. 2, 3, 4, 5, and 9 I show anti-friction guide-rollers K bearing upon opposite sides of or above the overhead way. In Figs. 2 and 3 these guide-rollers are supported and connected with anti-friction riding-wheels C' by side bars, L L. These bars may be of the form shown, or of any other suitable form, and may be of wood or metal, or any other suitable material, and have a resilient quality, if desired. The guide-rollers preferably bear in grooves in a bar, M, but, if desired, the surface of the bar may be plain, or the guide-rollers may be dispensed with. Upon opposite ends of the side bars, L, I prefer to provide suitable bumpers, N, which may be of wood or of elastic substance—such as rubber, cotton, or the like.

O indicates small steel guides curved at their lower ends, so as to keep the trundle from tilting. These may be integral with the bumpers, if desired.

The rollers used may be of wood, metal, leather, vulcanized fiber or paper, or may have bands or tires of leather, rubber, cloth, paper, or other suitable substance to render them noiseless.

In connection with the pivoted or switch section of the endless way, as indicated in Fig. 1 at x, I provide a fixed side track or way, P, onto which the trundles may be drawn by their pull-cords when not in use, or may be replaced on the track when needed in the same manner. In order to operate this switch from beneath and connect it with either way at will, I provide pulleys and cords, as illustrated in Fig. 16, or rods or wires and links and bell-cranks, as illustrated in Fig. 17. If desired, a spring, Z, tending always to keep the switch closed into the main way, may be employed.

My invention may be used also for teaching the art of swimming or the art of horseback-riding. It can be located on the outside or the inside of the path, where those can skate or ride who desire to do so without any support, so that two parties can move in a mass at different speeds at the same time without interfering with each other.

I am aware that rink appliances for aiding in skating, swimming, &c., of the general nature of those set forth herein, have been known before, as witness the English patent above mentioned, and also English Patent No. 1,477 of 1876; and my improvements are therefore limited accordingly to what is specifically pointed out in my appended claims.

Having described my invention, what I claim to be new and useful improvements, and desire to secure by Letters Patent of the United States, is—

1. In a rink appliance for aiding in skating, &c., in combination with an overhead endless way, a light trundle having riding-wheels, side bars, guide-rollers, and bumpers, and a bow and pendent cord, substantially as and for the purpose set forth.

2. In a rink appliance for aiding in skating, &c., in combination with an overhead endless way having a pivoted switch-section, movable horizontally, and a side track, a light anti-friction slide or trundle bearing on said way, a pendent bow and cord or the like, suitably connected with the slide or trundle, and pull-cords or the like connected with the switch, so that from beneath, by the pull-cords of the switch and trundle, they can be controlled at will, substantially as set forth.

In testimony whereof I have hereunto subscribed my name.

ROBERT H. RICE.

Witnesses:
 MARCUS S. HOPKINS,
 J. J. PEYTON.